(12) United States Patent
Baret et al.

(10) Patent No.: US 6,458,198 B1
(45) Date of Patent: Oct. 1, 2002

(54) CEMENTING COMPOSITIONS AND USE OF SUCH COMPOSITIONS FOR CEMENTING OIL WELLS OR THE LIKE

(75) Inventors: Jean-François Baret, Paris (FR); Sylvaine Leroy-Delage, Paris (FR); Bernard Dargaud, Elancourt (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/700,049
(22) PCT Filed: May 4, 1999
(86) PCT No.: PCT/EP99/03099
§ 371 (c)(1),
(2), (4) Date: Nov. 9, 2000
(87) PCT Pub. No.: WO99/58467
PCT Pub. Date: Nov. 18, 1999

(30) Foreign Application Priority Data

May 11, 1998 (FR) .............................................. 98 05884

(51) Int. Cl.$^7$ .............................................. C04B 16/06
(52) U.S. Cl. ......................... 106/644; 106/724; 106/811
(58) Field of Search .................................. 106/644, 724, 106/811

(56) References Cited

U.S. PATENT DOCUMENTS 4,537,918 A * 8/1985 Parcevaux et al. .......... 523/130
5,989,336 A * 11/1999 Carpenter et al. .......... 106/811

* cited by examiner

*Primary Examiner*—Paul Marcantoni
(74) *Attorney, Agent, or Firm*—Thomas O. Mitchell; Catherine Menes; Brigitte Jeffery

(57) ABSTRACT

The slurries were prepared using a reference slurry having a density of 16.4 lb/gal(US) (1.965 g/cm$^3$) of cement, with porosity of 55.18%. The cement was a class G Dickerhoff North cement. The slurries were prepared in the presence of on agent at a concentration of 0.4% by weight of cemenit (BWOC) and of an anti-foaming agent at a concentration of 0.03 gallons per (94 pound) sack of cement (gps); (a concentration of 0.1 gps corresponds to 0.90 liters of anti-foaming agent per 100 kg of cement). The suspension agent was added to the mixing water, and mixing took place at 4000 revolutions.

9 Claims, 1 Drawing Sheet

CEMENTING COMPOSITIONS AND USE OF SUCH COMPOSITIONS FOR CEMENTING OIL WELLS OR THE LIKE

The present invention relates to techniques for drilling oil, gas, water, or geothermal wells and the like. More precisely, the invention relates to cementing compositions that are particularly adapted to cementing zones which are subjected to extreme dynamic stresses.

In general, a well whose depth exceeds a few hundred meters is cased, and the annulus between the underground formation and the casing is cemented over all or part of its length. The essential function of cementing is to eliminate fluid interchange between the various layers of formation through which the borehole passes and to control ingress of fluid into the well, in particular by limiting ingress of water. In production zones, the casing is perforated, as indeed are the cement and the formation over a depth of several centimeters.

The cement placed in the annulus of an oil well is subjected to numerous stresses throughout the lifetime of the well. The pressure inside the casing can increase or decrease because of a change in the fluid filling the casing or because additional pressure is applied to the well, such as when drilling fluid is replaced by completion fluid or by fluid for a stimulation operation. A change in temperature also gives rise to stress on the cement, at least during the transient period, which precedes temperature equilibrium being reached between the steel and the cement. In most of the above cases, the stress process is sufficiently slow to be dealt with as though it was a static process.

Nevertheless, the cement can be stressed in other ways, which are dynamic, either, because they take place over a very short period of time or because they are periodic, or at least repetitive. Not only does making the perforations admit excess pressures of several hundreds of bars to the inside of the well, which are dissipated in the form of shock waves, but in addition it gives rise to shock when the projectile penetrates the cement. This shock subjects the zone surrounding the hole to large forces over a length of several meters.

Another process which is now very common in oil well operations and that also gives rise to dynamic stresses in the cement is opening a window in casing that has already been cemented for the purpose of creating a lateral well. The steel is milled over a height of several meters and then the lateral hole is bored, subjecting the cement to shock and vibration which generally damages it in irremediable manner.

An object of the present invention is to provide novel formulations, specifically for cementing regions of oil wells or the like that are subjected to extreme dynamic stresses, such as zones that are punctured and junctions with side well branches.

In the fields of building and civil engineering, it is well known to reinforce cement with fibers. By way of example, mention can be made of asbestos fibers or glass fibers for reinforcing thin materials, specifically materials in plate form. Polymer fibers made of polypropylene or nylon, or indeed carbon fibers for applications having particularly severe specifications, are also commonly used, specifically in sprayed concrete and facework treatment techniques. EP-576,401 discloses mortar composition which comprises an hydraulic cement, a mixture of admixtures, a continuum of particles between 0,1 $\mu$ and 10 mm and cast iron fibers having a length between 10 and 40 mm and preferably between 20 and 30 mm. The upper limit of workability of the fluid mortar composition is said to be no more than 42 kg/m$^3$.

In the field of oil industry cements, various publications have suggested using mineral fibers (U.S. Pat. No. 5,421,409), in particular asbestos fibers (U.S. Pat. No. 1,010,253), or other fibers commonly used in building or civil engineering (U.S. Pat. No. 1,006,713). In a May 1995 article VAN VLIET, VAN KLEEF, SMITH, PLOMPEN, KUIJEVENHOVEN, QUARESMA, and RAITURKAR VLIET, et al. have suggested using cements that include synthetic fibers, in particular fibers of polypropylene or nylon for sheathing oil wells. That article also suggests using the same synthetic fibers for applications such as making plugs or as a plugging material against circulation losses.

An object of the present invention is to obtain oil industry cements that are reinforced with fibers and that have improved properties of tensile strength and impact resistance. According to the invention, this problem is solved by adding fibers of amorphous cast metal to the cement slurry.

Amorphous cast metal fibers are known, e.g. from U.S. Pat. No. 4,520,859, and they are obtained by casting a fine ribbon of molten metal on a cold drum. Rapid cooling prevents crystallization, so the metal solidifies in the form of an amorphous material. The longest fibers give the best results from the point of view of tensile strength. It is thus preferable to use fibers that are at least 5 mm long. In addition, given that the width of the annulus to be cemented in an oil well is generally about 30 mm, the length of the fibers should not exceed 15 mm and preferably be between 5 and 10 mm.

Amorphous cast metal fibers are added to the cement slurry of the invention at a concentration of 3% to 15% by weight of fibers relative to the weight of cement, i.e. typically with fiber concentrations in the slurry of the order of 50 kg/m$^3$ to 200 kg/m$^3$, and preferably lying in the range 75 kg/m$^3$ to 150 kg/m$^3$.

In oil well cementing, non-homogeneous cement columns are not acceptable, particularly to when the wellbore is highly deviated. To avoid particle settling with such high concentrations of fibers, the yield stress $\tau_y$, i.e. the minimum stress to which the slurry must be submitted to flow, as defined using the Bingham Plastic rheogical model must be of at least 7 Pa and to remain pumpable, no more than 25 Pa, at the temperature of pumping. Preferred slurries have a yield stress ranging between 10 and 15 Pa. Anti-settling additives, such as cellulosic derivatives (hydroethylcellulose) or mixtures of biopolymer and silica flour for example are added to the slurry to adjust the yield stress.

At the higher concentrations, it is preferable to use mixtures of short fibers or mixtures of short and long fibers which mixtures present the advantages of short fibers from the point of pumpability.

As shown in particular in French patent application 97 11821 filed on Sep. 23, 1997 in the name of the Applicant, the risk of a cement sheath breaking due to an increase in the pressure or the temperature in a well is directly related to the tensile strength of the cement, and said risk is attenuated when the ratio of the tensile strength of the cement over its Young's modulus increases. It is recalled that the more flexible a material, the smaller its Young's modulus.

When an increase in temperature or pressure persists, sheath damage can also be caused by radial stresses acting on the sheath, which stresses are in compression.

From that work, it appears that any additive seeking to improve the mechanical properties of a cement sheath must give rise to a cement that has both improved tensile strength and improved strength in compression, a high degree of flexibility, and as large as possible a ratio of cement strength (in traction and in compression) over its Young's modulus. It is particularly noticeable that this is indeed the case with systems having amorphous cast metal fibers.

The amorphous cast metal fibers can be added to conventional slurries based on Portland cement, and also to special cementing slurries, e.g. a slurry based on aluminous cement.

The cement slurries according to the present invention are particularly suitable for cementing multi-lateral wells (due to their good impact resistance). There are also particularly adapted for borehole lining applications when the cement has to be drilled which fibers prevent cement from falling apart and provides a good impact resistance to the shock generated by the drill bits.

The present invention is illustrated by the following examples.

EXAMPLE 1

Fiber Selection

The influence of various fibers on the mechanical properties of a cement slurry has been studied on systems obtained under normal conditions of temperature and pressure (laboratory temperature and pressure).

Figure 1:
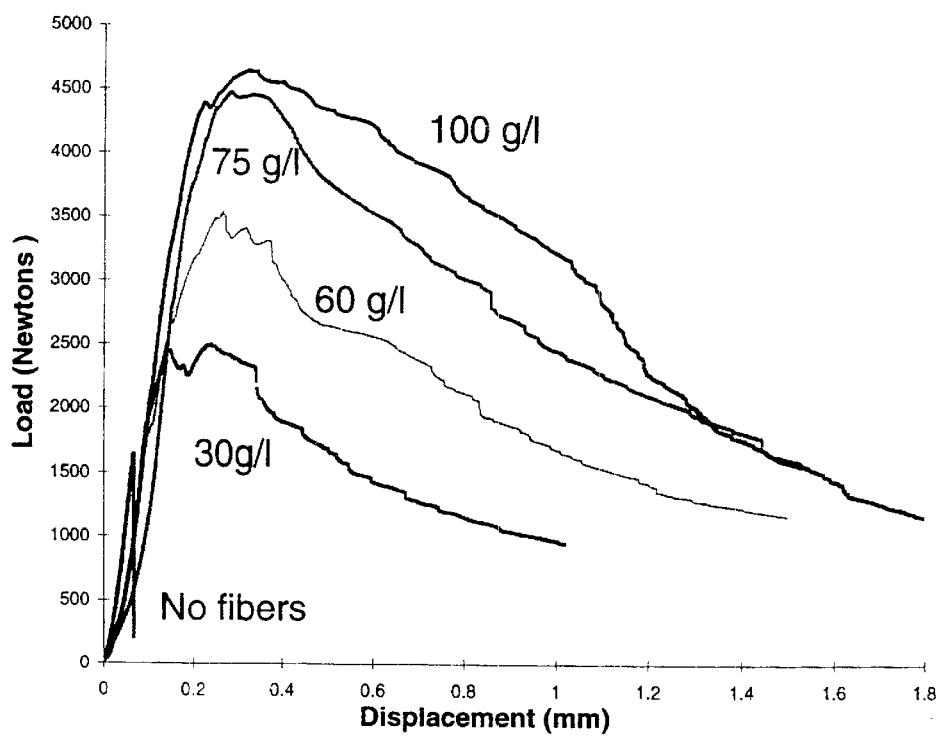
FIG. 1 shows a plot of bar displacement as a function of load during a bending test for cements containing fibers having a length of 15 mm.

The slurries were prepared using a reference slurry having a density of 16.4 lb/gal(US) (1.965 g/cm$^3$) of cement, with porosity of 55.18%. The cement was a class G Dickerhoff North cement. The slurries were prepared in the presence of a suspension agent at a concentration of 0.4% by weight of cement (BWOC) and of an anti-foaming agent at a concentration of 0.03 gallons per (94 pound) sack of cement (gps); (a concentration of 0.1 gps corresponds to 0.90 liters of anti-foaming agent per 100 kg of cement). The suspension agent was added to the mixing water, and mixing took place at 4000 revolutions per minute (rpm) for 5 minutes prior to adding the cement.

Under normal conditions of temperature and pressure (ambient temperature and pressure), the rheology of the slurry as measured under the conditions recommended by the American Petroleum Institute (API) was as follows:

| Rheology immediately after mixing | | | Rheology after 20 minutes conditioning at ambient temperature | | |
|---|---|---|---|---|---|
| Plastic viscosity | Yield Stress | | Plastic velocity | Yield Stress | |
| [mPa.s] | (lb/100 ft$^2$) | [Pa] | [mPa.s] | [lb/100 ft$^2$] | [Pa] |
| 41.0 | 52.4 | 25.1 | 70.5 | 58.1 | 27.8 |

The reference slurry was optimized so as to have relatively high Yield stress ($\tau_y$) to facilitate keeping the fibers in suspension. Slurries suitable for the present invention shall exhibit a yield stress of no less than 7 and preferably at least 10 Pa before the addition of the fibers. The fibers were added to the basic slurry in a Vortex type mixer, with stirring at slow speed.

The characteristics of the fiber used were as follows:

| Type of fiber | Length mm |
|---|---|
| Polypropylene | 12 |
| Nylon | 12 |
| Ribbon of amorphous cast metal | 5, 10 or 15 |

The fibers or the ribbon of amorphous cast metal can be obtained under the trademark Fibraflex from SEVA, Chalon-sur-Saône. France.

After setting far several days, mechanical properties were measured on test pieces in the form of bars that measured 16 cm×4 cm×4 cm (flexural strength tests) or cubes having a side of 5 cm (2 inches) for compression strength tests.

The results are given in Tables I and II where cc is the weight of added fibers (in grams per liter (g/l) of basic slurry). Table I relates to flexural strength (modulus of rupture in bending MR and Young's modulus in bending $E_B$) Table II relates to compressing strength (compression strength CS and Young's modulus in compression $E_C$).

Measuring flexural strength requires equipment that is simpler than that for measuring tensile, strength, with which it can be correlated. Empirically, it is estimated that flexural strength is twice tensile strength.

TABLE I

| Type of fibers added | Setting time (days) | Fibers' concentration in the slurry | | MR (MPa) | $E_B$ (MPa) | MR/$E_B$ (× 1000) |
|---|---|---|---|---|---|---|
| | | g/l | cm$^3$/l | | | |
| None | 3 | 0 | 0 | 3.70 | 2848 | 1.32 |
| Polypropylene | 3 | 17 | 18.9 | 4.35 | 5003 | 0.87 |
| Polypropylene | 3 | 9 | 10 | 5.34 | 4917 | 1.10 |
| Nylon | 5 | 8 | 6.7 | 5.38 | 4702 | 1.20 |
| Nylon | 5 | 17 | 15.2 | 5.25 | 4896 | 1.10 |
| Nylon | 5 | 33 | 29.5 | 6.07 | 4509 | 1.35 |
| 10 mm cast metal | 3 | 142 | 19.7 | 10.53 | 4231 | 2.62 |
| 10 mm cast metal | 5 | 71 | 9.9 | 9.81 | 5086 | 1.93 |
| 5 mm cast metal | 5 | 142 | 19.7 | 9.30 | 4638 | 2.01 |

TABLE II

| Type of fibers added | Setting time (days) | Fibers' concentration in the slurry | | CS (MPa) | $E_C$ (MPa) | CS/$E_C$ (× 1000) |
|---|---|---|---|---|---|---|
| | | g/l | cm$^3$/l | | | |
| None | 5 | 0 | 0 | 32.08 | 6616 | 4.90 |
| Polypropylene | 3 | 17 | 18.9 | 18.81 | 5520 | 3.41 |
| Polypropylene | 3 | 9 | 10 | 22.39 | 5241 | 4.27 |
| Nylon | 5 | 8 | 6.7 | 30.66 | 6530 | 4.72 |
| Nylon | 5 | 17 | 15.2 | 26.95 | 5927 | 4.55 |
| Nylon | 5 | 33 | 29.5 | 23.47 | 4859 | 4.83 |
| 10 mm cast metal | 3 | 142 | 19.7 | 27.72 | 7492 | 3.70 |

TABLE II-continued

| Type of fibers added | Setting time (days) | Fibers' concentration in the slurry | | CS (MPa) | $E_C$ (MPa) | $CS/E_C$ (× 1000) |
|---|---|---|---|---|---|---|
| | | g/l | cm³/l | | | |
| 10 mm cast metal | 5 | 71 | 9.9 | 34.36 | 7068 | 4.90 |
| 10 mm cast metal | 5 | 35 | 4.9 | 35.67 | 6407 | 5.61 |

In the absence of reinforcing fibers, the flexural strength of the reference cement was less than 4 MPa, giving tensile strength of about 2 MPa only, which is one-sixteenth of its compression strength. It can thus be expected that cements placed under particularly difficult stress conditions will be damaged above all by the action of stresses operating in traction or in compression.

Synthetic fibers improve the modulus of rupture in bending, and thus also the modulus of rupture in traction. A small loss of compression strength is observed, which increases with increasing quantity of added fibers. In any event, the ratio $MR/E_B$ is smaller with cements that are reinforced by synthetic fibers than with the unreinforced reference cement.

The increase in flexural strength is much better with fibers of amorphous cast metal, which give rise to a flexural strength modulus of about 10 MPa, i.e. about three times stronger than the reference cement whereas synthetic fibers, at best, made it possible to reach flexural strength of close to 6 MPa, while using a much larger volume of fibers, and thus a priori being much more difficult to handle while pumping in the annular gap of a well. It should also be observed that the formulations given in these tables are not optimized.

Even more remarkably, this greater tensile strength is not accompanied by a loss of flexibility, and on the contrary flexibility increases. Consequently, the ratio of flexural strength over Young's modulus in bending is greater still.

A consequence of adding synthetic fibers is to decrease compression strength and the greater the quantity of fibers added, the greater the decrease in compression strength. With fibers of amorphous cast metal, the decrease in compression strength begins to appear only at very high concentrations of fibers. On the contrary, at lower concentrations, greater compression strength is obtained.

EXAMPLE 2

Effect of Fiber Length

The influence of the length of fibers of amorphous cast metal was studied. The reference cement and the conditions of temperature and pressure were the same as for Example 1.

Setting time was 3 days for bending tests and 6 days for compression strength tests. The fibers were added at a concentration of 142 g/l.

| Fiber length | Flexural strength | | | Compression strength | | |
|---|---|---|---|---|---|---|
| | MR (MPa) | $E_B$ (MPa) | $MR/E_B$ (× 1000) | CS (MPa) | $E_C$ (MPa) | $CS/E_C$ (× 1000) |
| 15 mm | 11.48 | 4386 | 2.70 | 28.34 | 5444 | 5.28 |
| 10 mm | 10.53 | 4231 | 2.62 | 30.48 | 6156 | 4.97 |
| 5 mm | 9.30 | 4638 | 2.01 | 36.20 | 7571 | 4.79 |
| None | 3.70 | 2848 | 1.32 | 29.65 | 5139 | 5.85 |

Flexural strength increases with fiber length while compression strength decreases very slightly, while still remaining at a high level and well above that of flexural strength.

EXAMPLE 3

Impact Strength

Impact tests were performed on cement test pieces. These tests consisted in allowing a projectile to drop through a height of 1 meter onto disks of set cement. The disks were circular having a diameter of 70 mm and a thickness of 10 mm. The dynamic load was measured and recorded as a function of time.

The reference cement, without fibers, behaved like a brittle material and the energy absorbed by the test piece was estimated as being less than 10 Joules. Comparative tests have been done with pieces reinforced by Nylon fibers and Polypropylene fibers (the concentration being such that the volume of added fibers does approximately correspond to the volume of cast-metal fibers at a concentration of 100 g/l.

| Fiber length (mm) | Concentration (g/l) | Energy (Joules) | Dispersion |
|---|---|---|---|
| Without fibers | — | ~7–8 | 52.5% |
| 5 | 30 | 19.2 | 12.4% |
| 5 | 50 | 25,7 | 11.2% |
| 5 | 100 | 60.6 | 20.6% |
| 15 | 30 | 23.5 | 44.6% |
| 15 | 50 | 38,2 | 54.6% |
| 15 | 100 | 59.9 | 29.9% |
| Nylon fibers | 15.5 | 18,6 | 56.9% |
| Polypropylene | 12.5 | 34.3 | 31.8% |

The test pieces of cement reinforced by fibers of amorphous cast metal had significantly improved impact behavior, as can be seen from the above table. It should be noted that the results are extremely dispersed, due to the heterogeneity of the cement pieces (fibers, cement particles, etc.). To get an impact behavior significantly better than the behavior obtained with net or standard fibers, the concentration of cast-metal fibers has to be higher than 50 g/l.

This good impact behavior is particularly advantageous when cementing multilateral wells.

EXAMPLE 4

Cement Setting Under Well Conditions

The tests were performed again under temperature and pressure conditions close to the temperature and pressure conditions that are common in a well, i.e. at 170° F. (77° C.) and at 3000 psi (20.68 MPa).

The density of the basic slurry was 16.4 lb/gal(US) (1.965 g/cm³) of cement and its porosity was 55.26%. It was prepared using a class G Dickerhoff North cement and also contained 0.3% BWOC of suspension agent; 0.03 gps of anti-foaming agent, and 0.06 gps of a solution of a modified lignosulfonate acting as a cement setting retarder.

The rheology of the slurry, measured under the conditions recommended by the API were as follows:

| Rheology immediately after mixing at 20° C. | | Rheology after conditioning for 20 minutes at 77° C. | | Slurry characteristic | |
|---|---|---|---|---|---|
| Plastic viscosity [mPa.S] | Yield Stress [Pa] | Plastic viscosity [mPa.s] | Yield Stress [Pa] | Free water [ml] | Thickening time [mm] |
| 91.6 | 9.0 | 61.5 | 39.8 | 1.5 | 228 |

After 3 days in an enclosure at 77° C. and 20.68 MPa, the flexural strength of the bars was measured. For this test, the amount of energy released on breaking is also given (obtained by integrating the load-displacement curve for displacement between zero and the displacement at maximum load, i.e. the load at breaking).

| Fiber length | Fiber concentration | | MR | $E_B$ | $MR/E_B$ | Energy |
|---|---|---|---|---|---|---|
| | (g/l) | (BWOC) (%) | (MPa) | (MPa) | (× 1000) | (J) |
| — | 0 | | 8.24 | 5147 | 1.64 | 0.058 |
| 5 mm | 50 | 3.5 | 6.34 | 5230 | 1.21 | 0.032 |
| 5 mm | 142 | 10 | 8.45 | 4629 | 1.87 | 0.092 |
| 10 mm | 50 | 3.5 | 6.34 | 4797 | 1.33 | 0.038 |
| 10 mm | 142 | 10 | 12.53 | 4799 | 2.66 | 0.260 |
| 15 mm | 50 | 3.5 | 10.93 | 5516 | 2.16 | 0.307 |
| 15 mm | 142 | 10 | 15.00 | 4491 | 3.41 | 0.734 |

The results obtained under the temperature and pressure conditions of a well confirm for the most part the results obtained under normal conditions of temperature and pressure. Whatever the concentration or the length of the fibers, Young's modulus remained within the range 4500 MPa to 5500 MPa. Nevertheless, it should be observed that the figures given in the above table are average values, and variation between samples was quite large.

At 50 g/l, there is little difference between 5 mm fibers and 10 mm fibers. At higher concentration, 10 mm fibers are clearly better than shorter fibers. Whatever the concentration, 15 mm fibers give greater tensile strength.

EXAMPLE 5
Tests Using Aluminous Cement

For this test, a reference test piece prepared using an aluminous cement having 40% alumina (of the Ciment Fondu type sold by Lafarge, France) without fibers was compared with a test piece prepared using metal fibers that were 15 mm long. The bars were placed in a pressurized enclosure at 3000 psi (20.68 MPa) for 4 days at 24° C.

| Fiber concentration (g/l) | Density (g/cm³) | MR (MPa) | $MR/E_B$ (MPa) | $MR/E_B$ (× 1000) | Energy (J) |
|---|---|---|---|---|---|
| 0 | 1.65 | 4.19 | 3397 | 1.26 | 0.019 |
| 30 | 1.73 | 5.52 | 3796 | 1.49 | 0.032 |

This demonstrates that adding fibers significantly improves bending behavior without excessively degrading Young's modulus so that the ratio $MR/E_B$ is greater with cements of the invention.

EXAMPLE 6
The Effect of Fiber Concentration

The influence of fiber concentration was studied. The base slurry had a density of 16.4 lb/gal(US) (1.965 g/cm ) and was prepared using class G Dickerhoff North cement and had porosity of 55.18%. The slurry also contained 0.4% BWOC of suspension agent and 0.03 gps of anti-foaming agent.

The rheology of the slurry was as follows:

| Rheology immediately after mixing | | Rheology after conditioning for 20 minutes | | |
|---|---|---|---|---|
| Plastic viscosity [mPa.s] | Yield Stress [Pa] | Plastic viscosity [mPa.s] | Yield Stress [Pa] | Free water [ml] |
| 58.5 | 22.8 | 79.0 | 27.2 | 2 |

Bending behavior was measured after setting for 5 days under normal conditions of temperature and pressure, and the data is summarized in the tables below. FIG. 1 shows bar displacement as a function of load exerted during the bending test for cements containing fibers having a length of 15 mm.

It is considered that cement breakage takes place at the maximum of the load-displacement curve. With cements having reinforcing fibers, it can be seen firstly that there is a very significant increase in the load corresponding to said maximum, and secondly that behavior after breakage is very different, the network of fibers maintaining a degree of cohesion for the matrix and thus preventing sudden breakage.

15 mm fibers

| Fiber concentration | | MR | $E_B$ | $MR/E_B$ | Energy |
|---|---|---|---|---|---|
| (g/l) | % BWOC | (MPa) | (MPa) | (× 1000) | (J) |
| 0 | 0 | 3.70 | 2848 | 1.32 | 0.049 |
| 15 | 1 | 4.74 | 4359 | 1.10 | 0.048 |
| 30 | 2 | 4.98 | 3078 | 1.60 | 0.256 |
| 60 | 4 | 7.53 | 3103 | 2.46 | 0.447 |
| 75 | 5 | 9.63 | 3374 | 2.86 | 0.517 |
| 100 | 7 | 10.10 | 3122 | 3.24 | 0.840 |
| 142 | 10 | 11.48 | 4386 | 2.70 | 0.358 |

5 mm fibers

| Fiber concentration | | MR | $E_B$ | $MR/E_B$ | Energy |
|---|---|---|---|---|---|
| (g/l) | % BWOC | (MPa) | (MPa) | (× 1000) | (J) |
| 0 | 0 | 3.70 | 2848 | 1.32 | 0.049 |
| 15 | 1 | 4.05 | 3063 | 1.32 | 0.052 |
| 30 | 2 | 4.22 | 3127 | 1.35 | 0.053 |
| 60 | 4 | 5.53 | 3498 | 1.59 | 0.081 |
| 75 | 5 | 5.58 | 3096 | 1.8 | 0.136 |
| 100 | 7 | 6.15 | 3335 | 1.84 | 0.118 |
| 142 | 10 | 7.52 | 3674 | 2.05 | 0.255 |

Flexural strength increased regularly with fiber concentration. Except perhaps when there was a very high concentration of long fibers, Young's modulus was little affected by fiber concentration (the results are difficult to interpret given the dispersion of the meausurements).

Best results were obtained with fibers that were 15 mm long, with the fibers being at a concentration of 100 g/l, at which concentration the ratio of mechanical strength in bending over Young's modulus was about 2.5 times the ratio obtained with the reference slurry having no fibers.

EXAMPLE 7

Mixing Fibers

The above tests show that best results are obtained at higher concentrations of fibers. Nevertheless, pumping a slurry with relatively long fibers (15 mm) at that concentration of 100 kg/m³ or more turns out to be impossible with the pump configurations used for pumping well cements.

Further testing was performed on a slurry comprising a mixture of 5 mm fibers and 15 mm fibers. In this pumpability test, the cement slurry was replaced by a water mud constituted by a suspension of clay in water, having a viscosity of 51 mPa·s and a Yield Stress of 33.5 Pa, which constitutes very high rheology.

With a Triplex type pump, commonly used in oil fields, a cement slurry having 15 kg/m³ of 15 mm fibers caused the pump to "cough". It was not possible to pump a slurry having 30 kg/m³ of 15 mm fibers. However, there was no difficulty in pumping a fluid having 90 kg/m³ of 5 mm fibers.

Thereafter, 60 kg/m³ of 15 mm fibers were added to the fluid that already contained 90 kg/m³ of 5 mm fibers. In spite of having a fiber concentration of 150 kg/m³, pumping raised no difficulties.

Cements having a mixture of short fibers and long fibers present mechanical behavior that is associated with the long fiber concentration as can be seen by comparing the values from the following table with the flexural strength values obtained in Example 5.

| 5 mm fibers (g/l) | 15 mm fibers (g/l) | MR (MPa) | $E_B$ (MPa) | $MR/E_B$ (× 1000) | Energy (J) |
|---|---|---|---|---|---|
| 0 | 0 | 3.21 | 3035 | 1.08 | 0.0325 |
| 15 | 15 | 3.93 | 3175 | 1.27 | 0.0831 |
| 15 | 30 | 6.16 | 3025 | 2.03 | 0.2728 |
| 15 | 60 | 8.82 | 4014 | 2.30 | 0.5509 |

What is claimed is:

1. A cementing slurry for an oil well, comprising reinforcing fibers of amorphous cast metal and whose yield stress ($\tau_y$) immediately after mixing and before the introduction of the fibers is between 5 and 25 Pa.

2. The cementing slurry according to claim 1 characterized in that fiber concentration lies in the range 50 kg/m³ to 200 kg/m³ of cement slurry.

3. The cementing slurry according to claim 1 or 2, characterized in that said fibers are of a length lying in the range 5 mm to 15 mm.

4. The cementing slurry according to claim 3 characterized in that it includes a mixture of 5 mm fibers and of 15 mm fibers.

5. The cementing slurry according to claim 1, characterized in that it further includes a suspension agent.

6. The cementing slurry according to claim 1, said cementing slurry being used in cementing of zones that are subjected to extreme dynamic stresses including perforation zones and branch well junctions.

7. The cementing slurry according to claim 2, said cementing slurry being used in cementing of zones that are subjected to extreme dynamic stresses including perforation zones and branch well junctions.

8. The cementing slurry according to claim 3, said cementing slurry being used in cementing of zones that are subjected to extreme dynamic stresses including perforation zones and branch well junctions.

9. The cementing slurry according to claim 4, said cementing slurry being used in cementing of zones that are subjected to extreme dynamic stresses including perforation zones and branch well junctions.

* * * * *